(12) United States Patent
Lovatini et al.

(10) Patent No.: US 8,019,548 B2
(45) Date of Patent: Sep. 13, 2011

(54) ENABLING ANALYSIS OF A SURVEY SOURCE SIGNAL USING A TIME-BASED VISUALIZATION OF THE SURVEY SOURCE SIGNAL

(75) Inventors: Andrea Lovatini, Peschiera Borromeo (IT); Michele Belmonte, Albizzate (IT)

(73) Assignee: WesternGeco L. L. C., Houston, TX (US)

( * ) Notice: Subject to any disclaimer, the term of this patent is extended or adjusted under 35 U.S.C. 154(b) by 449 days.

(21) Appl. No.: 12/358,287

(22) Filed: Jan. 23, 2009

(65) Prior Publication Data
US 2010/0004868 A1    Jan. 7, 2010

Related U.S. Application Data

(60) Provisional application No. 61/077,787, filed on Jul. 2, 2008.

(51) Int. Cl.
*G01V 3/12* (2006.01)
(52) U.S. Cl. ................. 702/11; 702/14; 702/16
(58) Field of Classification Search ........... 702/2, 11, 702/14, 16, 18, 67, 71, 73, 74, 79, 106, 176, 702/177, 187; 324/348; 367/68; 703/2
See application file for complete search history.

(56) References Cited

U.S. PATENT DOCUMENTS

| 6,249,746 | B1 | 6/2001 | Neff et al. | |
|---|---|---|---|---|
| 6,901,028 | B2 * | 5/2005 | Clayton et al. | 367/68 |
| 7,705,599 | B2 * | 4/2010 | Strack et al. | 324/348 |
| 2009/0248373 | A1 * | 10/2009 | Druskin et al. | 703/2 |

FOREIGN PATENT DOCUMENTS

| JP | 2003232779 A | 8/2003 |
|---|---|---|
| JP | 2004361321 A | 12/2004 |
| KR | 10-19990071177 A | 1/1999 |

OTHER PUBLICATIONS

Chave, et al, Electrical Exploration Methods for the Seafloor, Electromagnetic Methods in Applied Geophysics vol. 2, 1991, Chapter 12, pp. 931-966.
PCT Search Report, dated Feb. 1, 2010, Application No. PCT/US2009/048458.

* cited by examiner

*Primary Examiner* — John H Le

(57) ABSTRACT

To enable analysis of a signal associated with surveying a subterranean structure, a processing system receives a time series of the signal associated with surveying the subterranean structure. A visualization of the time series is generated, where the visualization is a time-based representation of a characteristic of the signal. The visualization enables a determination of whether undesirable variations occur with the signal over time.

20 Claims, 4 Drawing Sheets

ENABLING ANALYSIS OF A SURVEY SOURCE SIGNAL USING A TIME-BASED VISUALIZATION OF THE SURVEY SOURCE SIGNAL

CROSS-REFERENCE TO RELATED APPLICATION

This claims the benefit under 35 U.S.C. §119(e) of U.S. Provisional Application Ser. No. 61/077,787, filed Jul. 2, 2008, which is hereby incorporated by reference.

TECHNICAL FIELD

The invention relates to enabling analysis of a survey source signal using a time-based visualization of the survey source signal.

BACKGROUND

Various electromagnetic techniques exist to perform surveys of subterranean structures underneath a surface for identifying structures of interest. Examples of structures of interest in the subterranean structure include subsurface resistive bodies, such as oil-bearing reservoirs, gas injection zones, and fresh-water aquifers. One survey technique is the controlled source electromagnetic (CSEM) survey technique, in which an electromagnetic (EM) transmitter (typically towed by a sea vessel in a marine environment) is used to generate electromagnetic signals.

Surveying units (or EM receivers) containing electric and magnetic field sensors are deployed on the sea floor within an area of interest to make measurements (of EM wavefields) from which a geological survey of the subterranean structure underneath the surface can be derived. Through the use of the CSEM technique, a high-resolution mapping of changes in resistivity associated with the presence of oil and hydrocarbon is possible. Measurements taken by the EM receivers are interpreted in such a way that a prediction of the presence and location of oil and hydrocarbon in the sedimentary layers of the subterranean structure can be made.

In a CSEM survey, the source signal produced by the EM transmitter (source) is typically recorded along with the survey data collected by the EM receivers. The source signal is usually recorded as a digital time series. Note that the source signal is a periodic signal that has a base period (the waveform of the source signal repeats every base period). For quality control, a characteristic (e.g., amplitude and/or phase) of the source signal is checked to ensure that the characteristic is consistent from base period to base period. Often, this checking of the characteristic of the source signal is accomplished by first transforming the time series representing the source signal into the frequency domain. The analysis of variations in the amplitude and/or phase of the source signal is then checked in the frequency domain. However, such analysis involves relatively heavy mathematical computations, since there typically is a relatively large volume of data, and transforming a large time series into the frequency domain can be computationally relatively expensive.

SUMMARY

In general, according to an embodiment, a method to enable analysis of a signal associated with surveying a subterranean structure includes receiving a time series of the signal, and generating a visualization of the time series of the signal. The visualization is a time-based representation of a characteristic of the signal. The visualization enables a determination of whether undesirable variations occur with the signal over time.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
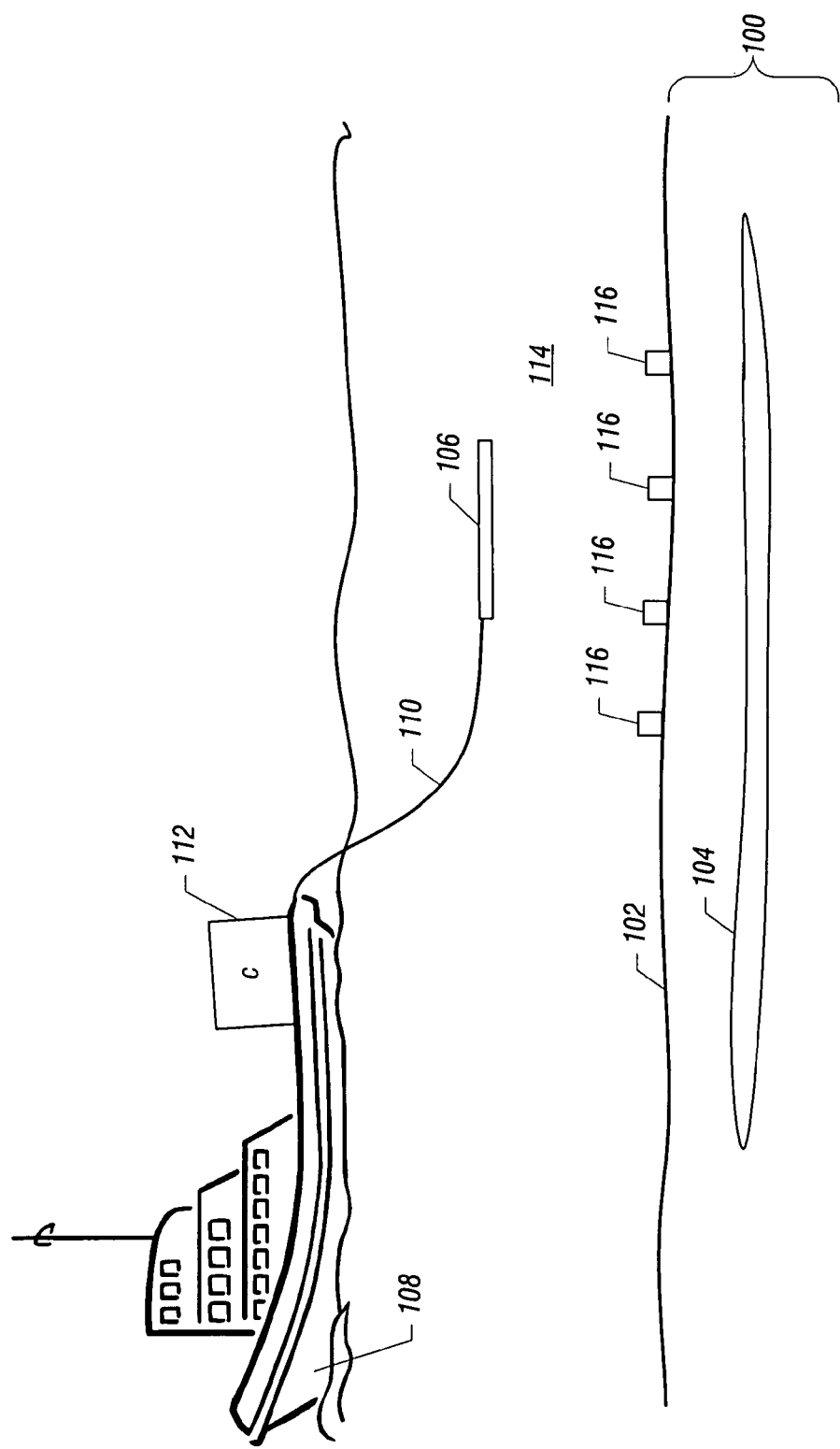
FIG. 1 is a schematic diagram of an exemplary survey arrangement in which an embodiment of the invention can be incorporated.

FIG. 1 illustrates an exemplary arrangement for performing a survey of a subterranean structure in a marine environment. As depicted in FIG. 1, electromagnetic (EM) surveying is performed of a subterranean structure 100 that is located below a water bottom surface 102 (e.g., sea floor). The subterranean structure 100 includes one or more subterranean elements 104 of interest, where the one or more subterranean elements can include a hydrocarbon-bearing reservoir, gas injection zone, fresh-water aquifer, or other elements of interest.

A controlled EM source (transmitter) 106 is towed by a marine vessel 108 by a tow cable 110. A controller 112 on the marine vessel can send control signals to the controlled source 106 to activate the controlled EM source 106 to emit EM fields that are propagated through a body of water 114 into the subterranean structure 100.

A line or array of EM receivers 116 are provided on the water bottom surface 102, where the EM receivers 116 are able to detect EM fields affected by the subterranean structure 100. The EM receivers 116 include sensing elements for sensing magnetic and/or electric fields.

At some point, survey data collected by the EM receivers 116 are communicated to the controller 112 on the marine vessel 108 (or a remotely located controller). The survey data measured by the EM receivers 116 is collected over time; the survey data is presented as a time series to the controller 112. It is noted that the source signal produced by the EM transmitter 106 is also recorded by the controller 112 as a time series.

Although reference is made to a source signal that is produced by an EM transmitter in the above embodiment, it is noted that techniques according to some embodiments can also be applied in the seismic survey context, in which a seismic source (in place of the EM transmitter 106) is used for producing seismic signals that are propagated into the subterranean structure 100. Seismic receivers (in place of the EM receivers 116) are then used to measure seismic signals reflected from the subterranean structure 100. The seismic source signal produced by the seismic source can also be recorded as a time series, in this alternative embodiment.

Moreover, even though FIG. 1 depicts a marine survey acquisition system, it is noted that in an alternative implementation, a land-based survey acquisition system can be employed. Techniques according to some embodiments can also be used with a land-based acquisition system.

In accordance with some embodiments, a relatively efficient mechanism is provided to enable quality control analysis of a source signal (EM source signal or seismic source signal) used in a survey acquisition system. Note that the source signal is a periodic signal that has a base period. The waveform of the source signal repeats every base period. It is desired that a characteristic of the source signal be consistent from base period to base period. For example, the characteristic can include the amplitude and/or phase of the source signal. Under certain conditions, the amplitude and/or phase of the source signal can vary from base period to base period, such as due to noise, equipment glitches, communication line faults, variations in delay in the communication line, and so forth. A mechanism according to some embodiments is able to detect for variations in the characteristic of the source signal, such that quality control can be performed.

Figure 2:
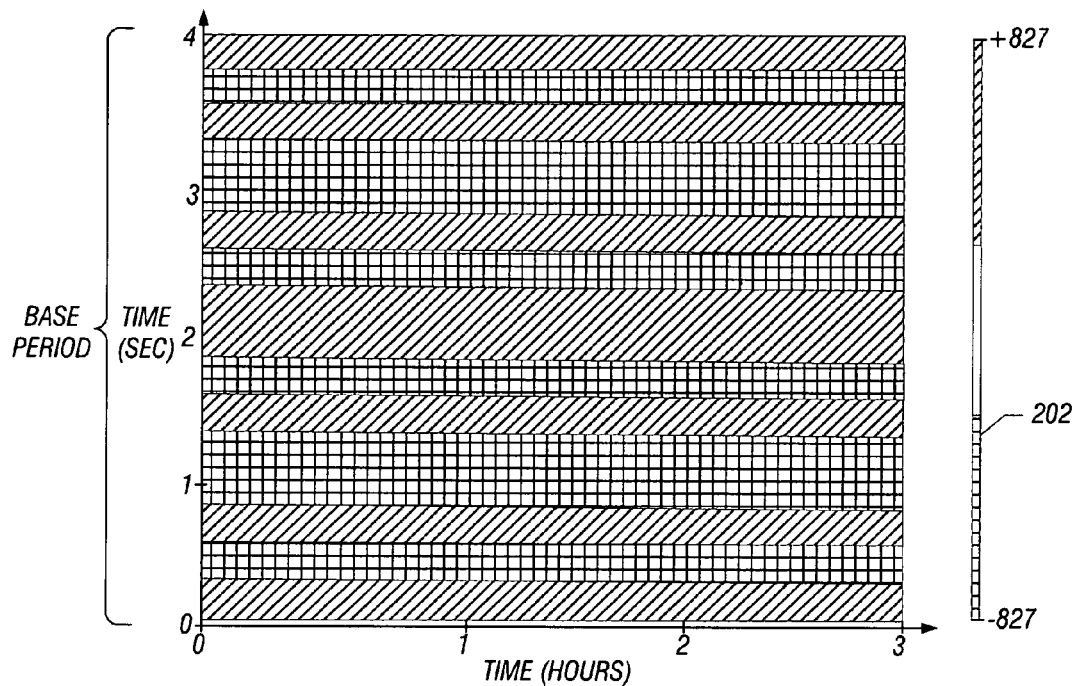
FIGS. 2 and 4 illustrate visualizations that are generated according to some embodiments to enable analysis of a source signal used in the survey of a subterranean structure.

In accordance with some embodiments, instead of first transforming the time series representing the source signal into the frequency domain to perform the quality control analysis, a time-based visualization of the source signal is produced instead. FIG. 2 shows an example of such visualization. FIG. 2 is a graph that has a vertical time axis and a horizontal time axis. A graph having multiple time axes can also be referred to as a chronogram. The vertical time axis represents time points within a base period of the source signal. The horizontal time axis contains time points in a time window that is larger than the base period. For example, if the base period is four seconds, then the vertical time axis will include time points from zero to four seconds. The horizontal time axis, on the other hand, contains time points in a much larger time window, such as a time window of several hours or several days.

The chronogram of FIG. 2 contains visual indicators to represent different values of the amplitude (or some other characteristic) of the source signal that is being analyzed. In the example of FIG. 2, the different visual indicators can be different colors, different patterns, different gray levels, and so forth. As seen in FIG. 2, the amplitude of the source signal varies in the vertical direction, which corresponds to a variation of the amplitude of the source signal over the base period.

Figure 3:
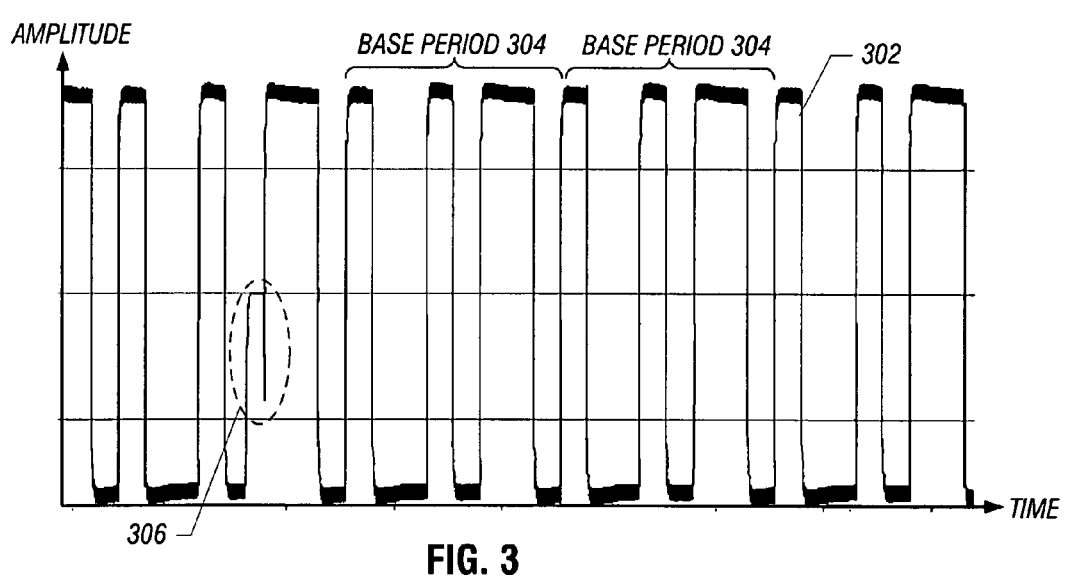
FIG. 3 is a timing diagram of the source signal.

An example of a source signal is depicted in the timing diagram of FIG. 3, which shows a time series of the source signal that plots amplitude versus time. The source signal 302 is generally periodic, and the base period of the source signal is represented as 304 in FIG. 3. Within each base period, the waveform of the source signal 302 varies between different amplitudes. The amplitudes of the source signal waveform in the base period is represented along the vertical axis of FIG. 2. In other words, a vertical line in the chronogram of FIG. 2 represents amplitudes of the source signal waveform within the base period, at a give time point along the horizontal time axis.

As noted above, it is desirable that the waveform of the source signal stays consistent from base period to base period to enable acquisition of accurate survey data. FIG. 3 shows a slight glitch 306 in the source signal 302 that can be detected using the chronogram according to some embodiments.

A scale 202 in the visualization of FIG. 2 maps different visual indicators (e.g., colors, patterns, gray levels, etc.) to different values of the amplitude. FIG. 2 presents an example of a source signal whose amplitude is relatively consistent over time (which in FIG. 2 is over several hours). Note that each horizontal bar (having a particular visual indicator) in FIG. 2 is relatively uniform in size from hour zero to hour three in the example of FIG. 2. This is an indication that the waveform of the source signal in each base period is relatively consistent over a time window of several hours.

Figure 4:
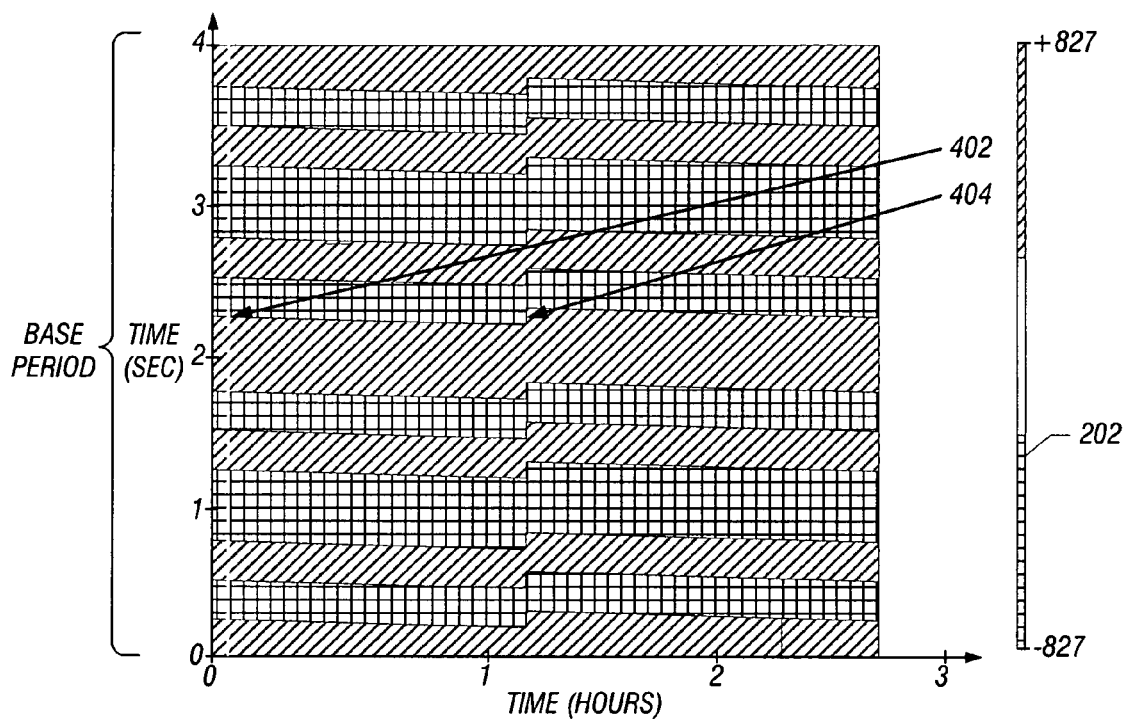

A different example is presented in FIG. 4, which shows discontinuities 402 and 404. The discontinuities 402, 404 may be caused by variations in amplitudes or the phase of the source signal being unstable, such as due to the various causes noted above.

A user or operator can easily detect discontinuities in the visualization that is generated by a mechanism according to some embodiments. This provides a convenient and cost-effective way of detecting that a source signal may not be consistent over time. As a result, the user or operator has the option of repeating the acquisition of survey data to obtain more accurate results.

Figure 5:
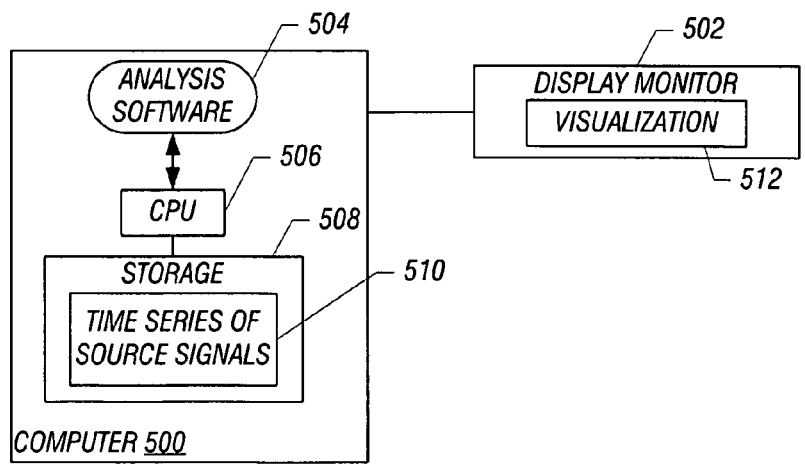
FIG. 5 is a block diagram of an exemplary computer system.

FIG. 5 shows an exemplary system that includes a computer 500 and a display monitor 502 connected to the computer 500. The computer 500 has analysis software 504 that is executable on one or more central processing units (CPUs) 506. The CPU(s) 506 is (are) connected to a storage 508, which can contain a time series of source signal 510 that is to be analyzed by the analysis software 504 in accordance with some embodiments.

The analysis software 504, based on the time series of source signal, produces a visualization 512 that is displayed in the display monitor 502. The visualization 512 can be a chronogram as depicted in FIG. 2 or FIG. 4.

Figure 6:
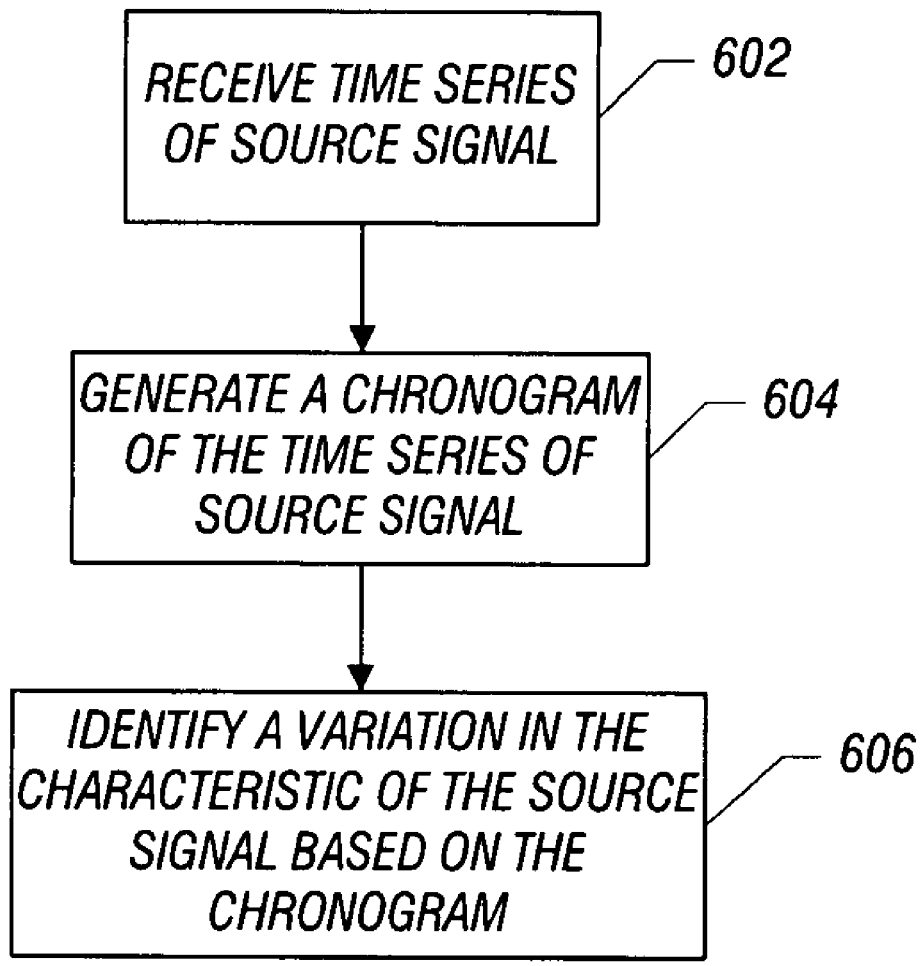
FIG. 6 is a flow diagram of a process of performing analysis of a source signal, in accordance with an embodiment.

FIG. 6 is a flow diagram of a process of performing quality control analysis of a source signal, in accordance with an embodiment. A time series of the source signal is received (at 602), such as by the analysis software 504 (FIG. 5). The analysis software 504 then generates (at 604) a chronogram of the time series of the source signal. Next, a variation in the characteristic (amplitude and/or phase) of the source signal is identified (at 606) based on the chronogram. The identification can be performed by a user, or alternatively, the identification can be by the analysis software 504 by performing image processing of the chronogram.

Instructions of software described above (including analysis software 504 of FIG. 5) are loaded for execution on a processor (such as one or more CPUs 506 in FIG. 5). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method to enable analysis of a signal associated with surveying of a subterranean structure, comprising:
   receiving, by a processing system, a time series of the signal associated with surveying the subterranean structure; and
   generating, by the processing system, a visualization of the time series of the signal, wherein the visualization depicts a representation of a waveform of the signal in a first time window, and wherein the waveform of the signal in the first time window is presented by the visualization over a second time window larger than the first time window to enable a determination of whether a characteristic of the signal in the first time window varies over time.

2. The method of claim 1, wherein generating the visualization comprises generating a graph having a first axis and a second axis, wherein the first axis corresponds to time points in the first time window, and wherein the second axis corresponds to time points in the second time window.

3. The method of claim 2, wherein the visualization comprises a chronogram.

4. The method of claim 2, wherein depicting the representation of the waveform of the signal in the visualization comprises assigning different visual indicators to different values of an amplitude of the waveform.

5. The method of claim 2, wherein depicting the representation of the waveform of the signal in the visualization comprises assigning different colors to different values of an amplitude of the waveform.

6. The method of claim 1, wherein depicting the representation of the waveform of the signal in the first time window comprises depicting the representation of the waveform of the signal in a base period of the signal.

7. The method of claim 6, wherein generating the visualization enables determining whether the characteristic is consistent from base period to base period.

8. The method of claim 1, wherein receiving the time series of the signal comprises receiving the time series of the signal generated by an electromagnetic transmitter.

9. The method of claim 1, wherein receiving the time series of the signal comprises receiving the time series of the signal generated by a seismic source.

10. The method of claim 1, wherein the first time window is a base period of the signal, the method further comprising:
    identifying a variation of the characteristic of the signal from base period to base period.

11. The method of claim 10, wherein identifying the variation of the characteristic of the signal comprises identifying the variation of at least one of an amplitude and phase of the signal.

12. The method of claim 1, wherein variation of the characteristic of the signal over time is represented as a discontinuity in the visualization.

13. An article comprising at least one computer-readable storage medium containing instructions that when executed cause a computer system to:
    receive a time series of a survey source signal used for performing surveying of a subterranean structure; and
    generate a visualization to be displayed in a display monitor of the computer system, where the visualization is a time-based visualization of a waveform of the survey source signal in a base period of the survey source signal, and wherein the time-based visualization further provides a representation of the waveform of the signal in the first time window over a second time window that is larger than the first time window.

14. The article of claim 13, wherein the instructions when executed cause the computer system to further:
    present a discontinuity in the visualization in response to variation of a characteristic of the survey source signal over time.

15. The article of claim 14, wherein the characteristic of the survey source signal comprises at least one of an amplitude and a phase of the survey source signal.

16. The article of claim 13, wherein the visualization is a graph having a first time axis and a second time axis, wherein the first time axis corresponds to the first time window, and the second time axis corresponds to the second time window.

17. A computer system comprising:
    a storage to store a time series of a survey source signal that is used for surveying a subterranean structure; and
    a processor to:
        generate a visualization of the time series of the survey source signal, wherein the visualization depicts a representation of a waveform of the survey source signal in a first time window, and where the waveform of the survey source signal in the first time window is presented by the visualization over a second time window larger than the first time window to enable a determination of whether a characteristic of the signal in the first time window varies over time.

18. The computer system of claim 17, wherein the first time window is a base period of the survey source signal.

19. The computer system of claim 18, wherein the characteristic of the survey source signal comprises at least one of an amplitude and phase of the survey source signal.

20. The computer system of claim 18, wherein the processor is to further present a discontinuity in the visualization in response to a variation of the characteristic.

* * * * *